US009122589B1

(12) United States Patent
Bono et al.

(10) Patent No.: US 9,122,589 B1
(45) Date of Patent: Sep. 1, 2015

(54) DATA STORAGE SYSTEM WITH UNIFIED SYSTEM CACHE

(71) Applicant: EMC Corporation, Hopkinton, MA (US)

(72) Inventors: Jean-Pierre Bono, Westborough, MA (US); Philippe Armangau, Acton, MA (US); David W. Harvey, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 223 days.

(21) Appl. No.: 13/930,164

(22) Filed: Jun. 28, 2013

(51) Int. Cl.
*G06F 12/00* (2006.01)
*G06F 12/02* (2006.01)
*G06F 12/08* (2006.01)
*G06F 3/06* (2006.01)

(52) U.S. Cl.
CPC .......... *G06F 12/0246* (2013.01); *G06F 3/0647* (2013.01); *G06F 12/0868* (2013.01)

(58) Field of Classification Search
CPC  G06F 12/0246; G06F 12/0868; G06F 3/0647
See application file for complete search history.

(56) References Cited

U.S. PATENT DOCUMENTS 5,809,543 A * 9/1998 Byers et al. .................. 711/162
7,814,270 B2  10/2010 Shimada
8,677,062 B2  3/2014 Benhase et al.

* cited by examiner

*Primary Examiner* — John Lane
(74) *Attorney, Agent, or Firm* — BainwoodHuang

(57) ABSTRACT

In a data storage system, a layered operating stack includes a file system layer, a file cache layer, and a unified cache layer including page descriptors each capable of referencing a data block stored in either/both DRAM or/and flash memory. A reference structure associates file references with corresponding page descriptors. The unified cache layer manages use of the memory for caching data blocks of files being written at the file system layer, including allocation, access, and eviction/destaging. Allocation establishes associative references in the reference structure, and access uses the reference structure to locate cached data blocks based on file references. Eviction/destaging relocates cached data blocks as necessary and includes first-level destaging from DRAM to flash and second-level destaging flash to physical storage. The first-level destaging maintains existing associative references and modifies page descriptors to add references to the flash.

20 Claims, 9 Drawing Sheets

700

DEFINE LAYERED OPERATING STACK INCLUDING FILE SYSTEM LAYER, FILE CACHE LAYER, AND UNIFIED CACHE LAYER, THE UNIFIED CACHE LAYER PROVIDING UNIFIED CACHE OF DATA BLOCKS STORED IN THE MEMORY INCLUDING PAGE DESCRIPTORS EACH CAPABLE OF REFERENCING A DATA BLOCK STORED IN EITHER OR BOTH THE DRAM OR/AND THE FLASH MEMORY, THE UNIFIED CACHE LAYER INCLUDING A REFERENCE STRUCTURE ASSOCIATING FILE REFERENCES AT THE FILE CACHE LAYER WITH CORRESPONDING PAGE DESCRIPTORS FOR FILE DATA BLOCKS OCCUPYING THE UNIFIED CACHE

702

BY UNIFIED CACHE LAYER, MANAGING USE OF THE MEMORY FOR CACHING DATA BLOCKS OF FILES WRITTEN AT THE FILE SYSTEM LAYER AND CACHED BY FILE CACHE LAYER:

704 ALLOCATION - ESTABLISHING ASSOCIATIVE REFERENCES IN THE REFERENCE STRUCTURE FOR DATA BLOCKS UPON INITIAL CACHING

706 ACCESS – USING REFERENCE STRUCTURE TO LOCATE CACHED DATA BLOCKS BASED ON FILE REFERENCES

708 EVICTION/DESTAGING - RELOCATING CACHED DATA BLOCKS TO CREATE ROOM FOR CACHING OTHER DATA BLOCKS, THE RELOCATING INCLUDING A FIRST-LEVEL DESTAGING OF DATA BLOCKS FROM THE DRAM TO THE FLASH MEMORY AT A FIRST TIME AND A SECOND-LEVEL DESTAGING OF DATA BLOCKS FROM THE FLASH MEMORY TO THE PHYSICAL STORAGE AT A LATER SECOND TIME, THE FIRST-LEVEL DESTAGING MAINTAINING EXISTING ASSOCIATIVE REFERENCES AND MODIFYING EXISTING PAGE DESCRIPTORS TO ADD RESPECTIVE REFERENCES TO THE FLASH MEMORY

710

FIG. 7

DATA STORAGE SYSTEM WITH UNIFIED SYSTEM CACHE

BACKGROUND

Block-based data storage systems conventionally include programming and hardware structures to provide block-based access to storage volumes. Such systems typically support Fibre Channel, iSCSI (Internet Small Computer System Interface), and/or other block-based protocols. With any of these block-based protocols, a data storage system may receive IO (input/output) requests from "hosts," i.e., computing devices accessing the data storage system, where the IO requests (also called "host IOs") specify locations to be read from or written to in the form of LUN identifiers (logical unit number, or volume) and particular offset ranges relative to the LUNs. For responding to IOs that specify read requests, the data storage system typically maps the specified LUNs and offsets to particular locations on disk drives or electronic flash drives, reads the data stored at the mapped locations, and returns the data to the hosts. For responding to IOs that specify write requests, the data storage system performs similar mappings, but writes the data to the designated locations. The IO requests may return results indicating whether the write requests succeeded or failed. An example of a block-based data storage system is the CLARiiON® system from EMC Corporation of Hopkinton, Mass.

File-based data storage systems are also known in the art. These systems include programming and hardware structures to provide file-based access to file systems. File-based data storage systems are sometimes referred to as NAS (Network Attached Storage) systems. Such systems typically support NFS (Network File System), CIFS (Common Internet File System), SMB (Server Message Block), and/or other file-based protocols. With file-based protocols, hosts can issue read and write IO requests by specifying particular file systems, paths, and file names. Internally to the data storage system, file system directories map the files specified by the host IOs to particular sets of blocks on internal volumes, which themselves are derived from disk drives or electronic flash drives. The data storage system accesses the mapped locations and performs the requested reads or writes. An example of a file-based data storage system is the Celerra® system from EMC Corporation of Hopkinton, Mass.

SUMMARY

The designs of block-based and file-based data storage systems often follow parallel paths. Indeed, it has been recognized that many of the features provided by block-based storage, such as replication, snaps, de-duplication, migration, failover, and non-disruptive upgrade, are similar to features provided for file-based data storage systems. Because of the different ways that block-based systems and file-based systems are typically constructed, however, it can be difficult to transfer advances in features for block-based systems to file-based systems, and vice-versa.

For user convenience, block-based and file-based storage systems are sometimes co-located, essentially side-by-side, to allow processing of both block-based and file-based host IOs in a single combined system. Such combined systems are often more difficult to support and maintain, however, than block-based or file-based systems individually. In addition, such systems tend to produce "stranded storage," i.e., storage that has been freed but cannot be reused because only an object of the same type (block-based or file-based) can reuse the storage but no current demand for storage from an object of the same type is pending. Such stranded storage can accumulate in these combined systems, allowing valuable storage resources to go unutilized.

In contrast with the separate block-based and file-based designs of conventional systems, an improved technique combines both block-based and file-based functionality in a unified data path architecture. The improved technique brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file.

In an example, the improved technique includes use of a unified system cache with connection to an upper-layer file cache in a manner enhancing performance especially for file write operations. Thus a disclosed data storage system includes a back-end interface to physical storage which includes flash memory storage, a front-end interface to a communications network coupling the data storage system to one or more host computers, and a storage processor having memory including battery-backed dynamic random-access memory (DRAM). The storage processor is configured to execute computer program instructions to cause the data storage system to provide data storage services to host computers using the physical storage.

In particular, a disclosed technique includes defining a layered operating stack including a file system layer, a file cache layer, and a unified cache layer. The unified cache layer provides a unified cache of data blocks stored in the memory including page descriptors each capable of referencing a data block stored in either or both the DRAM or/and the flash memory. The unified cache layer also includes a reference structure associating file references at the file cache layer with corresponding page descriptors for file data blocks occupying the unified cache.

In operation, the unified cache layer manages use of the memory for caching data blocks of files being written at the file system layer and cached by the file cache layer, the managing including operations of allocation, access, and eviction/destaging. Allocation operation establishes associative references in the reference structure for data blocks upon initial caching, and the access operation uses the reference structure to locate cached data blocks based on file references. The eviction/destaging operation relocates cached data blocks to create room for caching other data blocks. The relocating includes a first-level destaging of data blocks from the DRAM to the flash memory at a first time and a second-level destaging of data blocks from the flash memory to the physical storage at a later second time. The first-level destaging maintains existing associative references and modifies existing page descriptors to add respective references to the flash memory.

Important aspects of the disclosed technique include the reference structure generally as well as the page descriptors capable of referencing either or both DRAM and flash. The reference structure provides a relatively direct connection between the file system and the underlying unified cache resources/functions, increasing performance by avoiding more general mapping and file operations of intervening layers of the stack. The page descriptors contribute to the unified nature of the cache, i.e., tighter integration of and coordination between the DRAM and flash levels/sections.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

FIG. 7 is a flow diagram of high-level cache-related operation of the data storage system;

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for data processing in a data storage system combines both block-based and file-based functionality in a unified data path architecture. The improved technique simplifies design and maintenance and allows a common set of functions to be applied to both block-based and file-based objects. In particular, enhanced data services are provided across both types of object using one set of common mechanisms.

Figure 1:
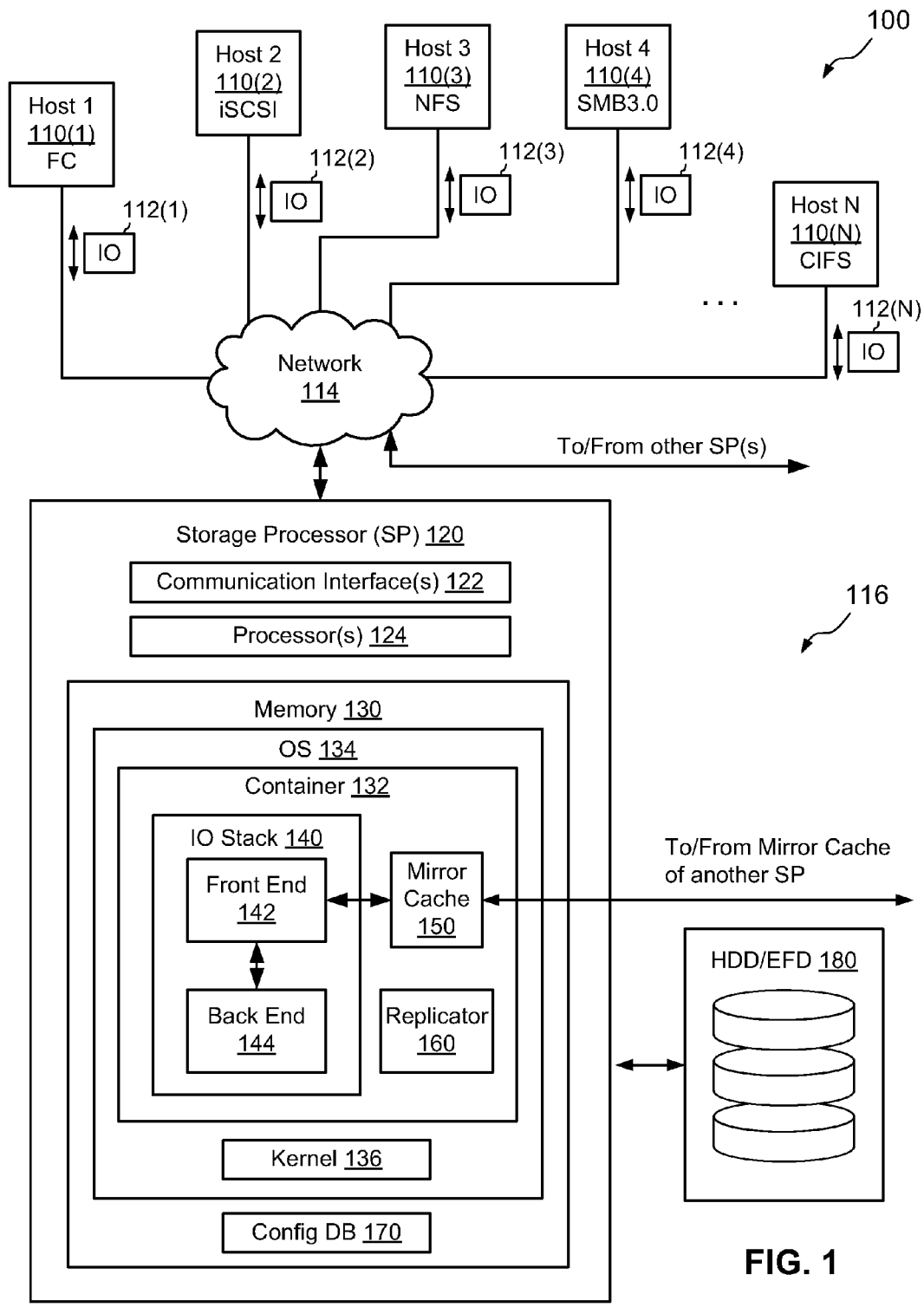
FIG. 1 is a block diagram showing a data storage apparatus in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated user-space execution context within the operating system 134. In various examples, the memory 130 may include multiple containers like the container 132, with each container providing its own isolated user-space instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
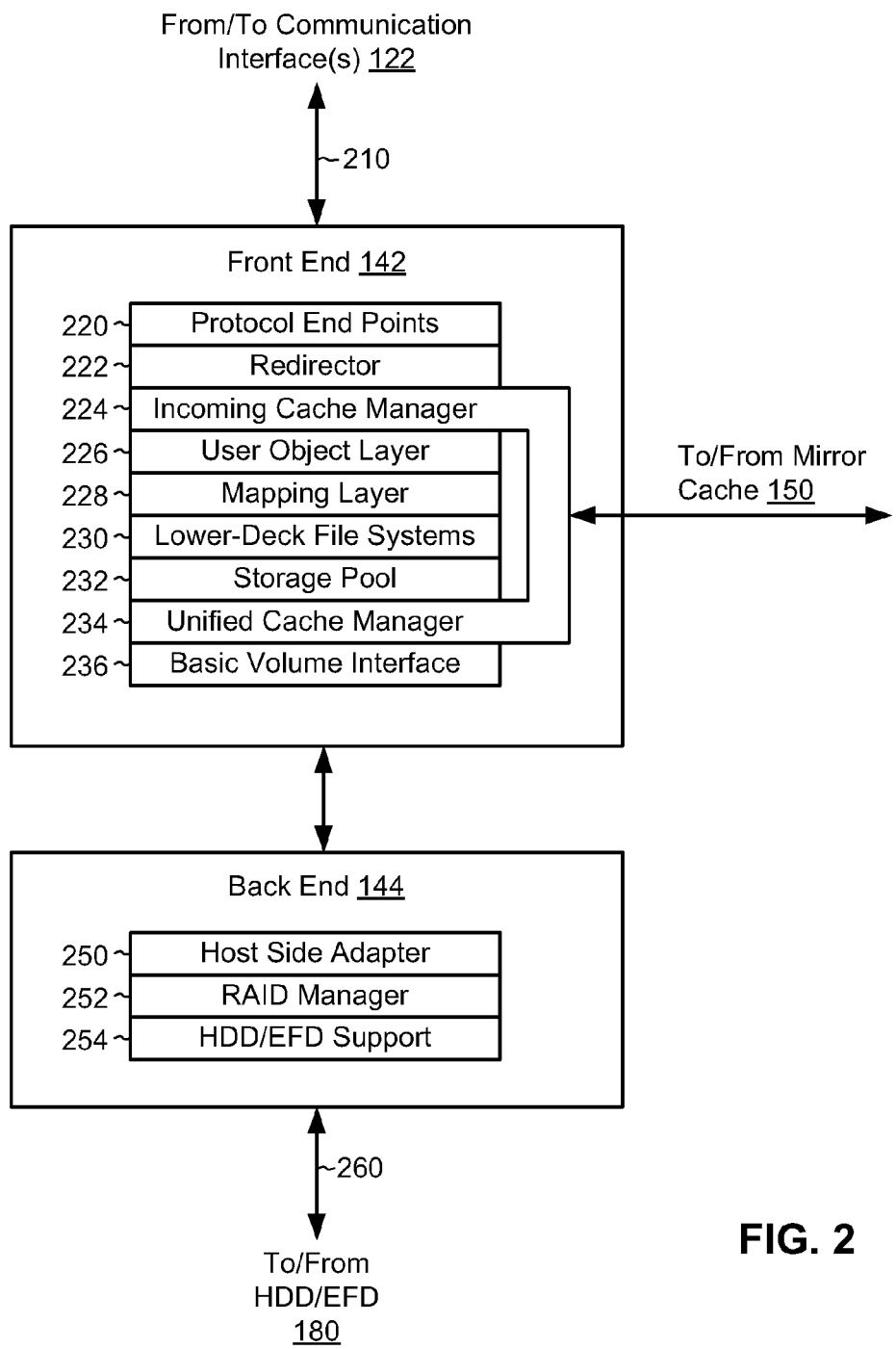
FIG. 2 is a block diagram showing particular example features of a storage processor of FIG. 1, including features of a front end and a back end of an IO stack.

FIG. 2 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
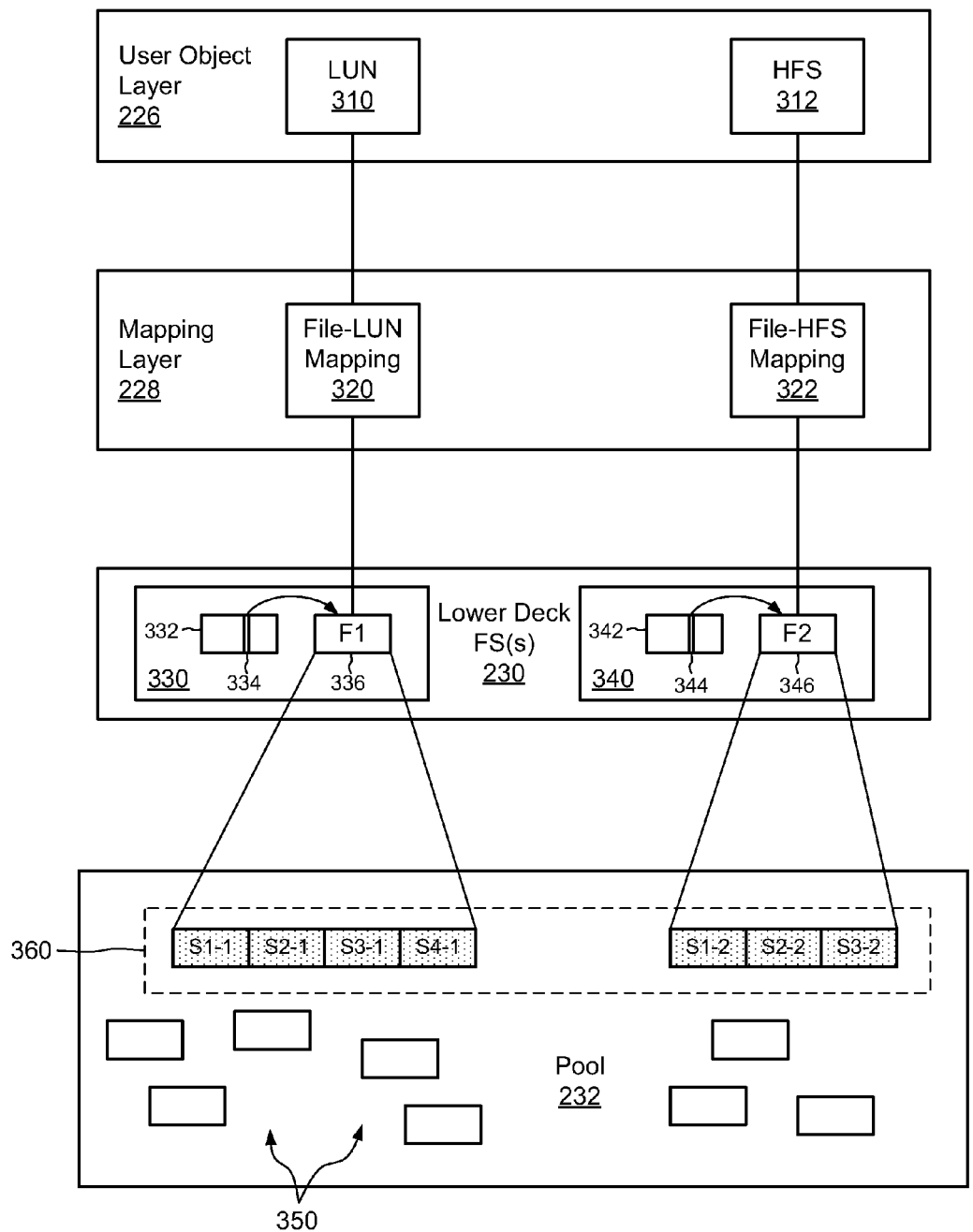
FIG. 3 is a block diagram showing example features of the front end of FIG. 2 in additional detail, including lower-deck file systems built upon storage units (e.g., slices) from a storage pool.

FIG. 3 shows portions of the front end 142 in additional detail. Here, the user object layer 226 includes a representation of a LUN 310 and of an HFS (host file system) 312, and the mapping layer 228 includes a file-to-LUN mapping 320 and a file-to-HFS mapping 322. The file-to-LUN mapping 320 maps the LUN 310 to a first file F1 (336), and the file-to-HFS mapping 322 maps the HFS 312 to a second file F2 (346). Through the file-to-LUN mapping 320, any set of blocks identified in the LUN 310 by a host IO is mapped to a corresponding set of blocks within the first file 336. Similarly, through the file-to-HFS mapping 322, any file or directory of the HFS 312 is mapped to a corresponding set of blocks within the second file 346.

The first file 336 and the second file 346 are included within the lower-deck file systems 230. In this example, a first lower-deck file system 330 includes the first file 336 and a second lower-deck file system 340 includes the second file 346. Each of the lower-deck file systems 330 and 340 includes an inode table, 332 and 342, respectively. The inode tables 332 and 342 provide information about files in respective lower-deck file systems in the form of inodes. For example, the inode table 332 of the first lower-deck file system 330 includes an inode 334, which provides file-specific information about the first file 336. Similarly, the inode table 342 of the second lower-deck file system 340 includes an inode 344, which provides file-specific information about the second file 346. The information stored in each inode includes location information (e.g., block locations) where the respective file is stored, and may thus be accessed as metadata to identify the locations of the files 336 and 346.

Although a single file is shown for each of the lower-deck file systems 330 and 340, it is understood that each of the lower-deck file systems 330 and 340 may include any number of files, each with its own entry in the respective inode table. In one example, each lower-deck file system stores not only the file F1 or F2 for the LUN 310 or HFS 312, but also snaps of those objects. For instance, the first lower-deck file system 330 stores the first file 336 along with a different file for every snap of the LUN 310. Similarly, the second lower-deck file system 340 stores the second file 346 along with a different file for every snap of the HFS 312.

As shown, a set of slices 360 is allocated by the storage pool 232 for storing the first file 336 and the second file 346. In the example show, slices S1-1 through S4-1 are used for storing the first file 336, and slices S1-2 through S3-2 are used for storing the second file 346. The data that make up the LUN 310 are thus stored in the slices S1-1 through S4-1, whereas the data that make up the HFS 312 are stored in the slices S1-2 through S3-2. In an example, the storage pool 232 allocates slices 350 to the set of file systems 230 in an on-demand manner, e.g., as the first file 236 and the second file 246 require additional storage. The storage pool 232 can also deallocate slices from the set of file systems 230 when all the currently allocated slices are no longer required.

In some examples, each of the lower-deck file systems 330 and 340 is associated with a respective volume, such as a sparse LUN. Sparse LUNs provide an additional layer of mapping between the lower-deck file systems 230 and the pool 232 and allow the lower-deck file systems to operate as file systems normally do, by accessing underlying volumes. Additional details about sparse LUNs and their relation to lower-deck file systems may be found in U.S. Pat. No. 7,631, 155, which is hereby incorporated by reference in its entirety.

The incorporated patent uses the term "container file systems" to refer to constructs similar to the lower-deck file systems disclosed herein.

Figure 4:
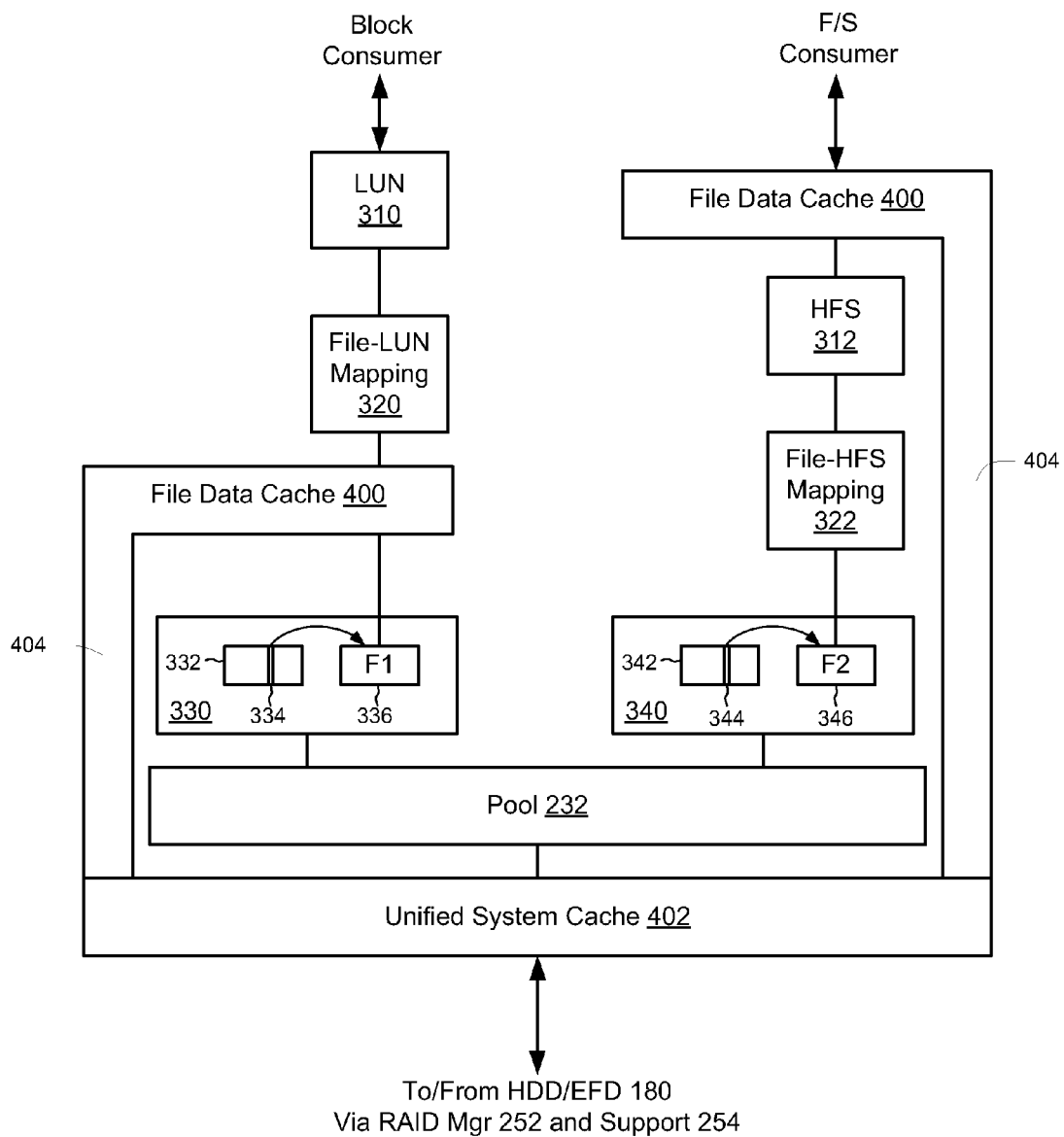
FIG. 4 is a block diagram of cache-related features of the data storage system.

FIG. 4 illustrates structure and functionality pertaining to caching as performed/managed by the incoming cache manager 224 and unified cache manager 234 of FIG. 2. At higher layers is a file cache including a file data cache 400 as well as separate file metadata caches (not shown in FIG. 2; described below). The file cache is operated by the incoming cache manager 224. At a lower layer is a unified system cache 402 operated by the unified cache manager 234. The unified system cache 402 includes both dynamic-RAM (DRAM) storage as well as flash-memory storage, as described more fully below. The DRAM storage is part of the SP memory 130 (FIG. 1), and the DRAM part of the cache 402 is mirrored to another SP as mentioned above. The flash-memory storage is carved out of one or more enterprise flash drives (EFDs) included in HDD/EFD 180. The file data cache 400 is a logical cache that relies on the unified system cache 402 for the actual underlying storage of data blocks of files—it does not represent separate physical cache storage. Similarly, the flash-memory part of the unified system cache 402 is a logical cache relying on the HDD/EFD 108 for underlying physical flash memory storage.

As indicated by the vertical extents 404 of the file data cache 400, part of the functionality involves a relatively direct connection to the unified system cache 402, not involving intervening layers such as a lower-deck file system 330, 340. This direct connection provides for greater efficiency in overall cache operation. For example with respect to file objects, file operations are generally separated from the lower block-storage layers by the file-HFS mapping 322 and lower-deck file system 340, and in general it is necessary to go through these layers to resolve file-layer data specifiers (e.g., file offset and length) to lower-layer block addresses. The direct connections 404 provide a shortcut that also captures the mapping but can be accessed and utilized much more quickly, for faster cache operation.

Also shown in FIG. 4 is the placement of the file data cache 400 in the above-discussed two distinct uses, i.e., for a block object such as LUN 310 and a file object such as an HFS 312. For a block object, the file data cache 400 operates at the level of files (e.g. file F1 336) of a lower-deck file system (e.g. 330), whereas for a file object the file data cache 400 operates at the level of a file of the HFS 312. The description below focuses primarily on operation in connection with file objects, but it will be apparent to those skilled in the art that analogous operation can occur for block objects with suitable modifications.

Figure 5:
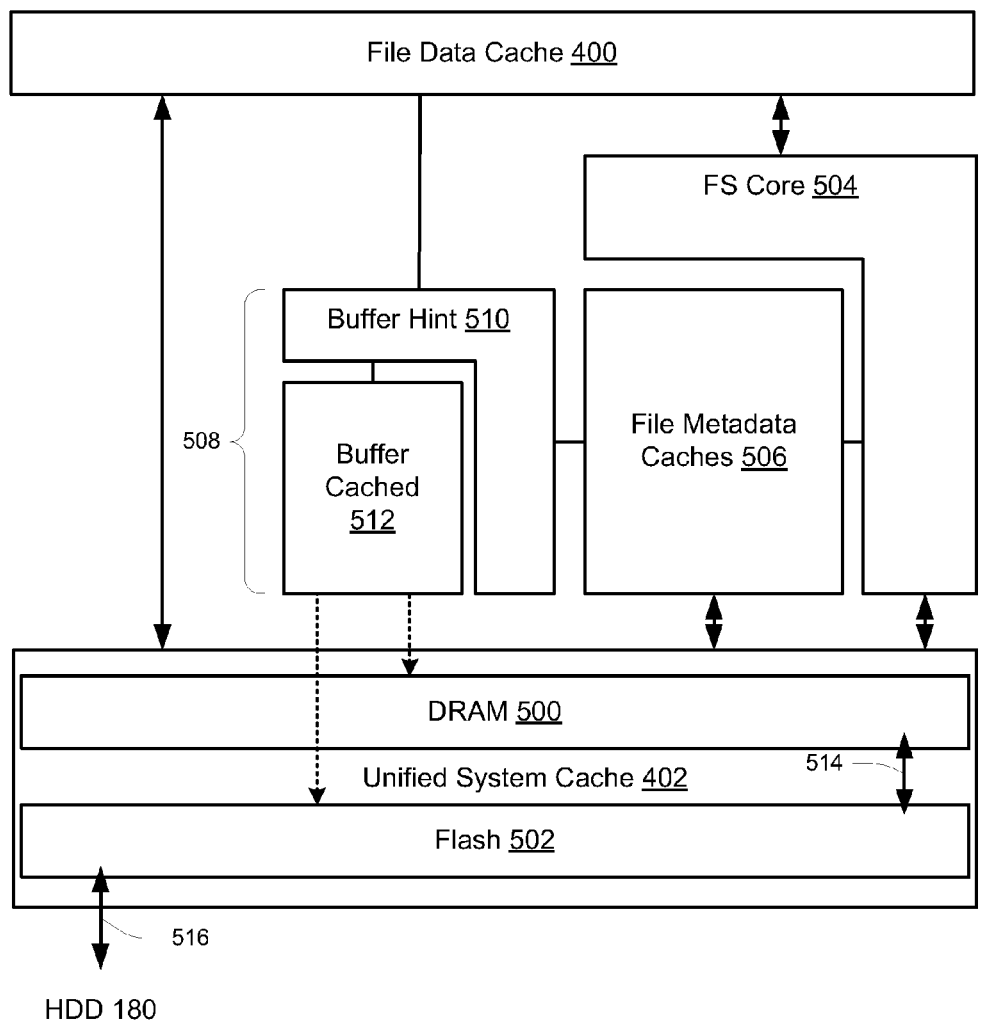
FIG. 5 is a block diagram of additional cache-related features of the data storage system.

FIG. 5 shows additional detail of cache-related structure/functions. As mentioned above, the unified system cache 402 includes a DRAM section 500 and a flash-memory (flash) section 502. Also shown are components of a lower-deck file system 230 (FIG. 3) including a file system (FS) core 504 and file metadata caches 506, the latter also being part of the file cache as mentioned above. The file metadata caches 506 are used for frequently accessed file system metadata so as to improve performance. Examples of metadata caches 506 include an Inode cache, block metadata cache, slice map cache, etc.

The connection between the file data cache 400 and the unified system cache 402, as well as between the file metadata caches 506 and the unified system cache 402, is via a reference structure 508 that includes buffer hint descriptors 510 and buffer cached descriptors 512. The reference structure 508 resolves file-based references generated by the file data cache 400 and file metadata caches 506 to corresponding data blocks stored in the unified system cache 402, enabling file data or metadata to be stored or retrieved thereto/therefrom. Additional detail about these operations are described below.

While the file data cache 400 is used for both file read and file write operations, it can provide a certain beneficial performance effect with file write operations in particular. One feature of distributed file operations is the requirement that writes be "persisted", i.e., stored non-volatilely, as a condition to acknowledging the write operation back to the originator (e.g., to a host 110). Both the DRAM 500 and flash 502 provide non-volatile storage (the latter inherently and the former using battery backup), and the direct connections via the reference structure 508 enable writes to be applied very quickly to one or the other and thus to also be acknowledged quickly.

Arrows 514 and 516 in FIG. 5 represent movement of data blocks between different levels of the storage hierarchy. At 514 is movement between the DRAM 500 and flash 502, and at 516 is movement between the flash 502 and an underlying HDD 180. In the case of writes, data is typically moved from the DRAM 500 to the flash 502, and from the flash 502 to an HDD 180. In general there may be little benefit to using the flash section 502 of the cache 402 in front of an EFD residing within the HDD/EFD storage 180, due to their comparable performance, and thus for EFDs there may be another mode of operation involving only the DRAM section 500 and movement of data directly from there into the EFD. Such operation would be separate from the multi-stage operation described below.

Also, data may be destaged from DRAM 500 to flash 502 but may need to be staged back into DRAM 500 upon reference through either read or write access. Modes of operating may depend on particular implementation of cache miss functionality. For example, it might be decided to read the data from HDD and populate the data in both DRAM 500 and flash 502, or just in DRAM 500.

Figure 6:
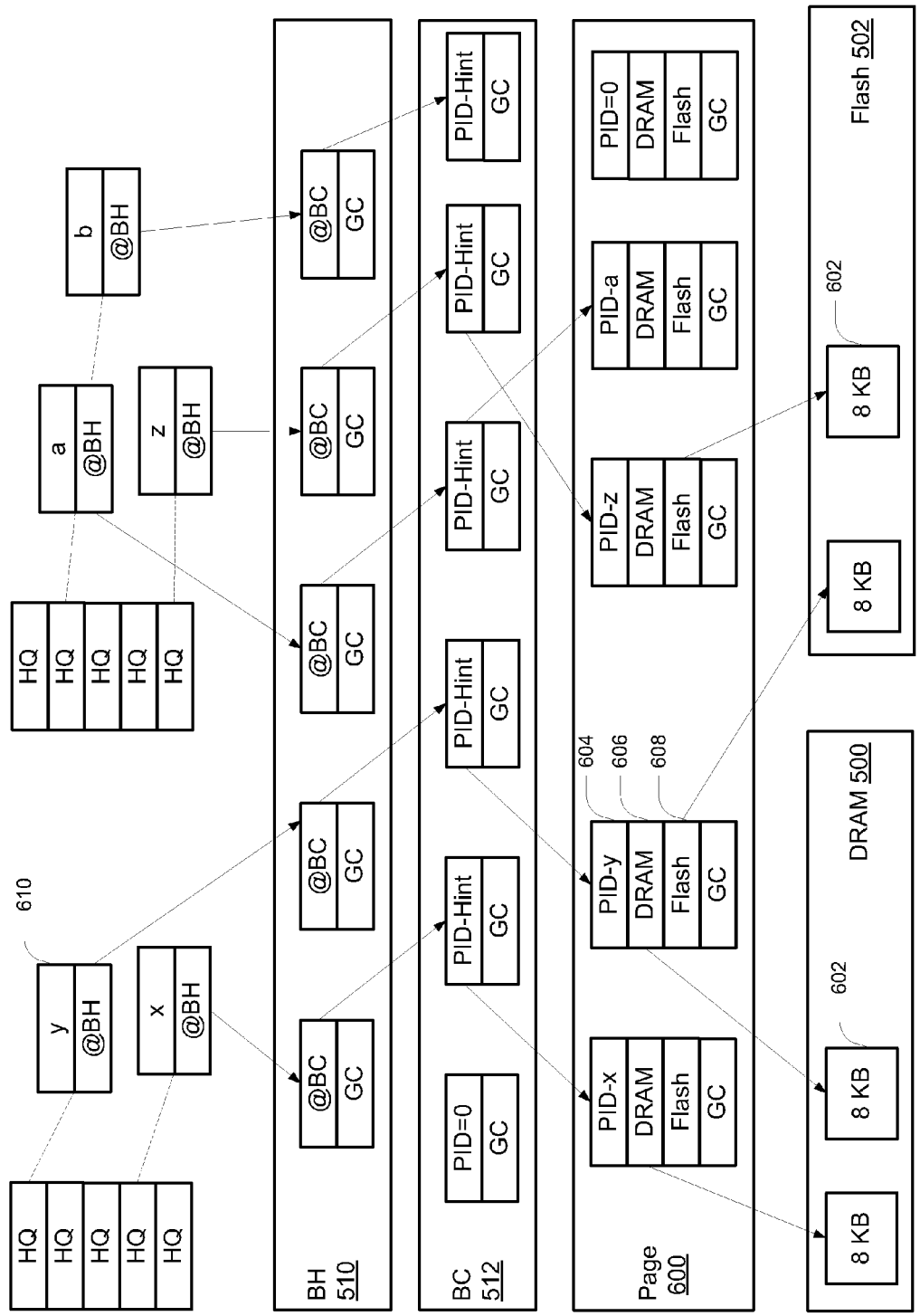
FIG. 6 is a schematic diagram of a reference structure.

FIG. 6 illustrates the structure and use of the buffer hint descriptors 510 and buffer cached descriptors 512. These are used in conjunction with page descriptors 600 for data blocks 602 stored in the DRAM 500 and flash 502. All accesses are via the buffer hint (BH) descriptors 510, which as shown include pointers @BC to buffer cached (BC) descriptors 512. The buffer cached descriptors 512 in turn contain pointers PID-Hint to page descriptors 600. Each page descriptor 600 includes a page identifier value (PageID-#) 604, a DRAM pointer 606 for a pointer to a data block stored in DRAM 500, and a Flash pointer 608 for a pointer to a data block stored in flash 502. This structure provides support for different operating conditions in which a data block is stored only in DRAM 500, only in flash 502, or in both simultaneously. This structure thus reflects the "unified" nature of the unified system cache 402, in which a single data structure tracks locations of blocks in both DRAM 500 and flash 502.

All the descriptors in FIG. 6 also include generation count values GC that reflect their dynamic reallocation during operation, as described briefly below.

At the top of FIG. 6 are structures shown as hash queues or HQueues (HQ) having HQueue entries 610, each having a pointer @BH pointing to a BH descriptor 510. The HQueues are structures of the cache users, i.e., the file data cache 400 and file metadata caches 506, and each HQueue entry 610 is a hash value calculated from a corresponding file-level reference. For example, the file data cache 400 identifies file data by a set of information including a file system ID, a file ID, an offset and a length. This is the set of values seen by mapping layer 322 in mapping an HFS 312 to a file 346 of a lower-deck file system 340. This set of values is also hashed to provide hash values that uniquely identify corresponding data blocks of a file, and these hash values appear as HQueue entries 610 for blocks that are actively being accessed by the file data cache 400 and file metadata caches 506.

Thus, the complete connection from the file cache to the underlying physical data block in the unified cache 402 is via the hash values of the HQueue entries 610, to the buffer hint descriptors 510 and the buffer cached descriptors 512. In operation, the cache managers 224, 234 dynamically create and modify these items and use them for accessing and using blocks of physical storage 180 based on file-level activity.

In operation, the descriptors 510, 512 and 600 are reallocated or "recycled" as the contents of the caches 400, 402 change. Recycling may be driven either top-down or bottom-up. Top-down refers to a response to operations of the file data cache 400 or file metadata caches 506, whereas bottom-up refers to a response to conditions within the unified system cache 402 itself as it balances competing demands.

As an example of top-down-driven recycling, the file data cache 400 may decide to stop caching a given (first) file and start caching another (second) one. At that point it effectively replaces the HQueue entries 610 containing hashes of the first-file information with new HQueue entries 610 containing hashes of the second-file information. When existing HQueue entries 610 are removed or modified, the unified cache manager 234 can remove or invalidate the associated buffer hint descriptors 510, buffer cached descriptors 512, page descriptors 600 and data blocks 602, and all these items can be identified as available for allocation to new blocks being brought into the cache. Then a separate process of storing new data in the cache can claim the recycled items for that new data.

Bottom-up-driven recycling occurs when it is necessary to remove one set of data from the cache 402 to make room for another set of data, presumably one that is more current and will make more efficient use of the cache. The unified cache manager 234 maintains a block aging structure, referred to as "LRU" for "least recently used", to track the timing of recent accesses of the data blocks 602. Separate LRUs are maintained for the DRAM section 500 and flash section 502. As current accesses require that new data be moved into either section 500, 502, and no unused blocks 602 are available, the corresponding LRU is consulted to identify data blocks 602 to be removed or "evicted" to make room for the new data. These data blocks will be moved or "destaged" to the next layer of storage as appropriate. Blocks evicted from the DRAM section 500 are destaged to the flash section 502, and blocks evicted from the flash section 502 are destaged to an HDD of physical storage 180. These operations are represented by the arrows 514, 516 shown in FIG. 5 and discussed above. The new data is then written as new data blocks 602 in the freed areas of the DRAM section 500 or flash section 502 as the case may be.

When a given data block 602 is evicted completely from the cache 402 (i.e., it no longer resides in either the DRAM 500 or the flash 502), then the set of descriptors 600, 512, 510 that refer to it can be removed or invalidated and reassigned. Some or all may be modified for use with the new data being brought into the cache 402. Note that invalidation is achieved very easily by bumping up (incrementing) the GC of the BC descriptor 512 or page descriptor 500 when they get recycled.

When a data block is being destaged from DRAM 500 to flash 502, the set of descriptors is maintained rather than deleted, and the page descriptor 600 is modified. At de-staging time, preferably both the DRAM pointer 606 and flash pointer 608 are maintained and it is left to subsequent events to determine the state these pointers need to transition to:

1. When the buffer is referenced for write access, then the flash pointer 608 may be dropped
2. When the buffer is referenced for read access, then both pointers may be kept
3. When the DRAM data block needs to be recycled, then the data block pointer 606 may be dropped
4. When the flash data block needs to be recycled, then the flash block pointer 608 may be dropped It will be appreciated that there may be other operations in which the reverse can occur, i.e., a data block is being moved from flash 502 into DRAM 500 and in that case the page descriptor 600 is modified to remove/invalidate the flash pointer 608 and populate the DRAM pointer 606.

In some cases the same file data may occupy data blocks 602 of both the DRAM 500 and flash 502 simultaneously, and in such cases both the DRAM pointer 606 and flash pointer 608 are populated and valid for the two respective (identical) blocks 602. This can occur, for example, when data is deemed to be "hot" or frequently accessed and thus promoted from flash 502 to DRAM 500. In some cases the copy in flash 502 is still maintained, for example if there are no other current demands for use of the space. In such a case, if the block 602 is later evicted from the DRAM 500, the only action required initially is to invalidate the DRAM pointer 606, and any subsequent accesses will find the block 602 residing in the flash 602 until such later time as it is also evicted/destaged from that section.

The following is a brief description of how the Generation Counts (GC) are used.

When a Buffer_Hint 510 is associated to a BC descriptor 512 the GC of the BC descriptor 512 is saved in the Buffer_Hint 510 itself. When the BC descriptor 512 is recycled, its GC is incremented. When an attempt is made to morph a Hint into a reference on a BC descriptor 512, it will succeed only if the GC in the BH 510 matches the GC of the BC descriptor 512.

Similar logic may be used between the BC descriptor 512 maintaining hints on the page descriptors 600. The PID Hint hosted in the BC descriptor 512 contains the Page-ID and its GC. When the page descriptor 600 is recycled, its GC is incremented. When an attempt is made to morph a Hint into a reference on a page descriptor 600, it will succeed only if the GC in the PID Hint matches the GC of the page descriptor 600.

FIG. 7 is a flow diagram for high-level operation. In the following description references are given in parentheses to specific disclosed structure/function as an aid to understanding only—these are not meant as limiting the description to the specific referenced items.

At 700, a layered operating stack (e.g., 140) is defined that includes a file system layer (312), a file cache layer (400), and a unified cache layer (402). The unified cache layer provides a unified cache of data blocks (602) stored in memory including page descriptors (600) each capable of referencing a data block stored in either or both the DRAM (500) or/and the flash (502) memory. The unified cache layer also includes a reference structure (508) associating file references at the file cache layer with corresponding page descriptors for file data blocks occupying the unified cache.

Step 702, which includes sub-steps 704, 706 and 708, is performed by the unified cache layer. It includes managing use of the memory for caching data blocks of files being written at the file system layer and cached by the file cache layer. The managing includes operations of allocation (704), access (706), and eviction/destaging (708).

At 704, the allocation operation establishes associative references in the reference structure for data blocks upon initial caching.

At 706, the access operation uses the reference structure to locate cached data blocks based on file references.

At 708, the eviction/destaging operation relocates cached data blocks to create room for caching other data blocks, the relocating including a first-level destaging of data blocks from the DRAM to the flash memory at a first time and a second-level destaging of data blocks from the flash memory to the physical storage at a later second time. The first-level destaging maintains existing associative references with modification of existing page descriptors to add respective references to the flash memory.

As shown, operating software may be stored on and instantiated from a non-transitory computer-readable medium 710 such as a magnetic or optical disk or nonvolatile semiconductor memory such as flash memory.

Figure 8:
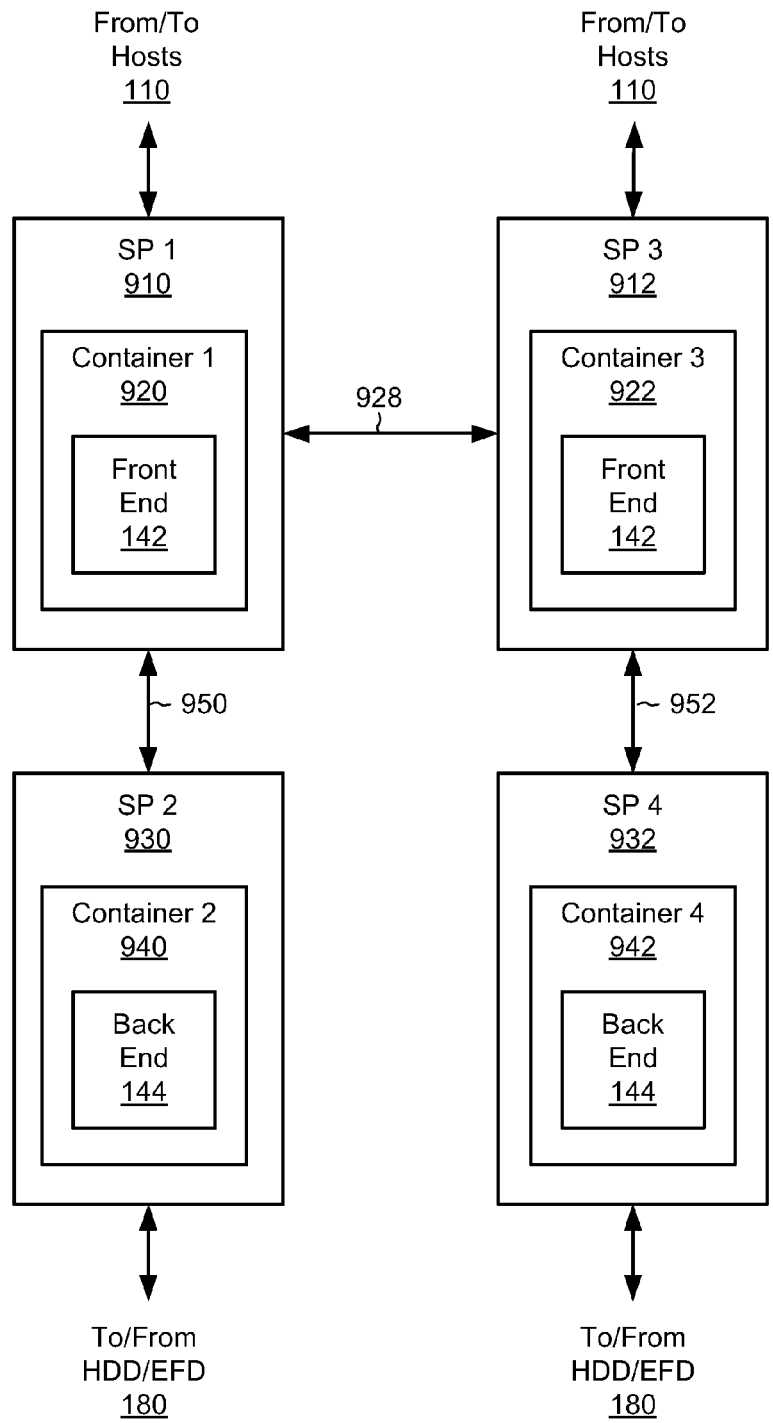
FIG. 8 is a block diagram showing an example arrangement involving three storage processors in a modular arrangement, where two storage processors are configured to run front ends and one storage processor is configured to run a back end.
Figure 9:
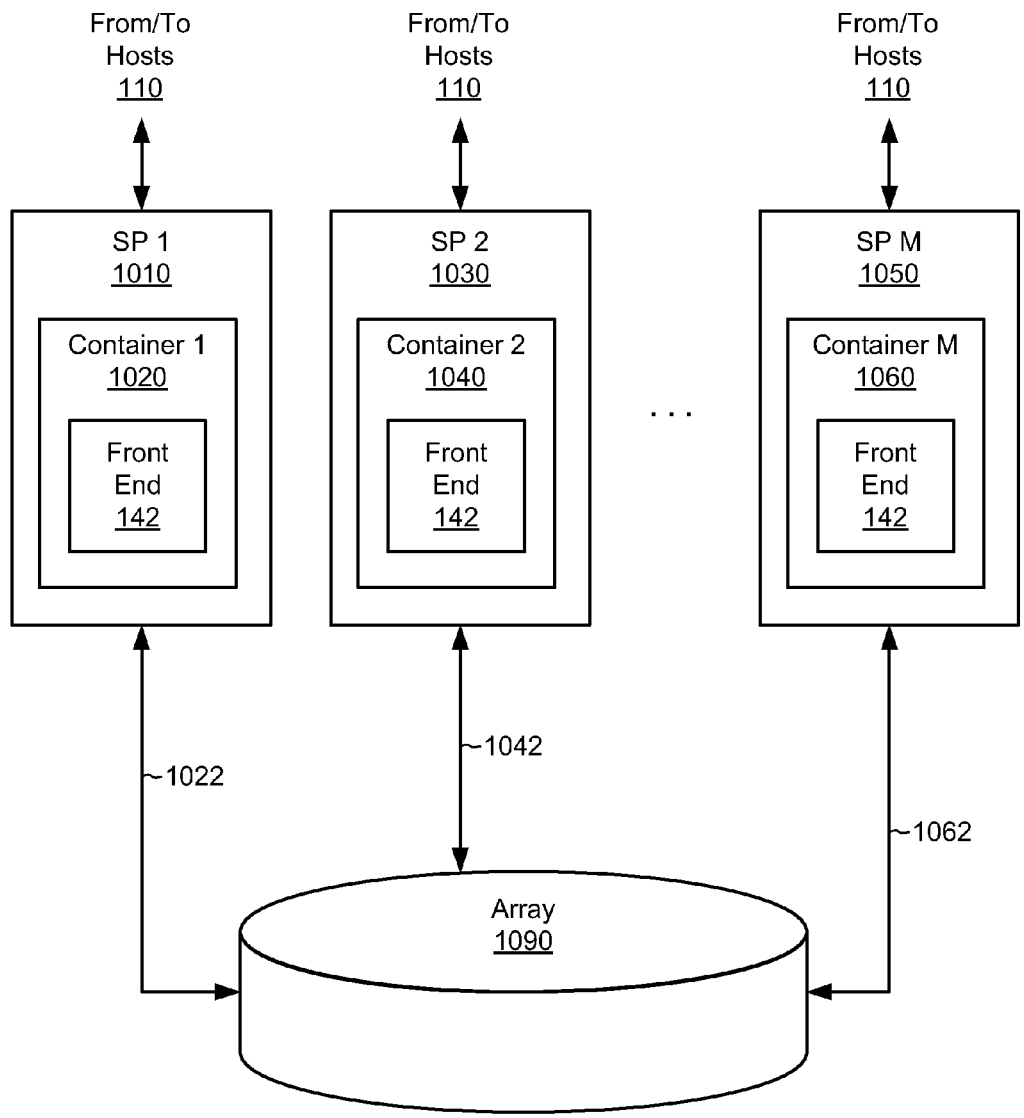
FIG. 9 is a block diagram that shows an example arrangement in which multiple storage processors run respective front ends and are connected in a gateway configuration to a data storage array.

FIGS. 8 and 9 show different deployments of the IO stack 140. In FIG. 8, a modular deployment is shown in which a first SP 910 houses a front end 142 in a first container 920 and a second SP 930 houses the back end 144 in a second container 940. An interconnection 950 is formed between the first SP 910 and the second SP 930. In an example, the interconnection 950 is made using Fibre Channel or some other block-based protocol. To support cache mirroring (via connection 928), as well as other functions, a parallel arrangement may be formed with a third SP 912 housing a front end 142 in a third container 922 and a fourth SP 932 housing a back end 144 in a fourth container 942. An interconnection 952 is formed between the third SP 912 and the fourth SP 932. With this arrangement, performance gains can be realized over the integrated configuration of FIG. 1, because the modular configuration dedicates the computing and memory resources of multiple SPs to handling host IOs, and because each SP is optimized for operating as a front end or as a back end but is not required to operate as both. Also, although the first SP 910, the second SP 930, the third SP 912, and fourth SP 932 are physical SPs, any of the SPs housing front ends 142 (SP1 and SP3) can themselves house any number of virtualized storage processors.

FIG. 9 shows a gateway arrangement, in which multiple SPs 1010, 1030, . . . , 1050 each house a front end 142 in respective containers 1020, 1040, . . . , 1060. Interconnections 1022, 1042, . . . , 1062 (such as Fibre Channel) respectively connect the SPs 1010, 1030, . . . , 1050 to an array 1090. The array 1090 includes its own internal back end, for responding to block-based IOs. Although three SPs are shown providing front ends 142, it is understood that a greater or lesser number of SPs providing front ends 142 may be provided. Also, cache mirroring and other functions may be best supported by providing SPs in pairs. Thus, the number of SPs in the gateway arrangement is preferably even. Suitable examples of the array 1090 include the VMAX® and VPLEX® storage arrays available from EMC Corporation of Hopkinton, Mass.

An improved technique has been described for a data storage apparatus that combines both block-based and file-based functionality in a unified data path architecture. The improved technique brings together IO processing of block-based storage systems and file-based storage systems by expressing both block-based objects and file-based objects in the form of files. These files are parts of an underlying, internal set of file systems, which are stored on a set of storage units served by a storage pool. Because block-based and file-based objects are all expressed as files of this set of file systems, a common set of services can be applied across block-based and file-based objects. Also, storage units released by any file or files of the underlying, internal set of file systems can be reused by any other file or files, regardless of whether the files represent LUNs, file systems, vVols, and so forth. Inefficiencies of stranded storage are thus greatly reduced or completely eliminated.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the lower-deck file systems 230 have been described as storing file representations of LUNs, host file systems, block-based vVols, file-based vVols, and snaps of any of the foregoing. These are merely examples, however. Other types of objects may be stored in the lower-deck file systems 230 as file representations, such as virtual hard disks (VHDs), virtual machine disks (VMDKs), internal file systems used by the data storage apparatus 116, and internal volumes, for example.

In addition, as shown and described, different types of objects (LUNs, host file systems, etc.) are shown and described as being stored in respective lower-deck file systems. This is merely an example, however. Alternatively, any of LUNs, host file systems, block-based vVols, and file-based vVols, as well as snaps of any of the foregoing, may be included together in a single lower-deck file system or in any number of lower-deck file systems. Thus, it is not required that files representing different types of objects be stored in different lower-deck file systems.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1150 in FIG. 12). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:
1. A data storage system, comprising:
a back-end interface to physical storage including flash memory;
a front-end interface to a communications network coupling the data storage system to one or more host computers; and a storage processor, the storage processor having memory including battery-backed DRAM, the storage processor being configured to execute computer program instructions to cause the data storage system to provide data storage services to the host computers using the physical storage by:

defining a layered operating stack including a file system layer, a file cache layer, and a unified cache layer, the unified cache layer providing a unified cache of data blocks including page descriptors each capable of referencing a data block stored in either or both the DRAM or/and the flash memory, the unified cache layer including a reference structure associating file references at the file cache layer with corresponding page descriptors for file data blocks occupying the unified cache; and by the unified cache layer, managing use of the memory for caching data blocks of files being written at the file system layer and cached by the file cache layer, the managing including operations of allocation, access, and eviction/destaging, the allocation operation establishing associative references in the reference structure for data blocks upon initial caching, the access operation using the reference structure to locate cached data blocks based on file references, and the eviction/destaging operation relocating cached data blocks to create room for caching other data blocks, the relocating including a first-level destaging of data blocks from the DRAM to the flash memory at a first time and a second-level destaging of data blocks from the flash memory to the physical storage at a later second time, the first-level destaging maintaining existing associative references and modifying existing page descriptors to add respective references to the flash memory.

2. A data storage system according to claim 1, wherein the file system is an upper-deck file system whose files are stored in a file of a lower-deck file system located in the layered operating stack between the upper-deck file system and the physical storage.

3. A data storage system according to claim 2, wherein the layered operating stack further includes a pool layer for managing the physical storage, the pool layer located between the lower-deck file system and the physical storage.

4. A data storage system according to claim 1, wherein the file system is a lower-deck file system presenting one or more files to an upper storage object layer, each file storing a block storage object.

5. A data storage system according to claim 1, wherein the reference structure is a three-layer structure including page descriptors for cached data blocks, buffer cached (BC) descriptors having references to the page descriptors, and buffer hint (BH) descriptors having references to the BC descriptors, the BH descriptors being associated with hashes of file identification information identifying areas of files of the file system.

6. A data storage system according to claim 5, wherein the descriptors of the three-layer structure are recycled dynamically during operation in response to activity of the file system, recycling being induced in both a top-down manner and a bottom-up manner, the top-down manner being responsive to removal of a file from the file cache, the bottom-up manner being responsive to a need to evict a data block to make room for a new data block.

7. A data storage system according to claim 5, wherein, upon a data block being destaged from the DRAM to the flash memory, a set of associated descriptors is maintained rather than deleted and it is left to subsequent events to determine a new state that pointers of an associated page descriptor transition to as follows:
(1) when a buffer is referenced for write access, then a flash memory pointer is deleted or invalidated;
(2) when a buffer is referenced for read access, then respective values of both a DRAM pointer and a flash memory pointer are maintained;
(3) when a DRAM data block is recycled, then a DRAM pointer is deleted or invalidated; and
(4) when a flash memory data block is recycled, then a flash memory pointer is deleted or invalidated.

8. A data storage system according to claim 5, wherein the descriptors employ a set of generation counts by which the use and recycling of the descriptors is managed, including:
(1) when a BH is associated to a BC, a generation count of the BC is saved in the BH, and when the BC is recycled its generation count is incremented, and wherein an attempt to morph a BC-hint from a BH into a reference on a BC will succeed only if the generation count in the BH matches the generation count of the BC; and
(2) when a page descriptor is recycled, a generation count of the page descriptor is incremented, and an attempt to morph a page-hint from a BC into a reference on a page descriptor will succeed only if the generation count in the page-hint matches the generation count of the page descriptor.

9. A data storage system according to claim 1, wherein the file cache layer includes a file data cache and one or more file metadata caches, the file data cache providing the file references and the file data blocks stored in the unified cache, the file metadata caches maintaining cached copies of file system metadata also stored in the unified cache, the reference structure associating metadata references of the file metadata caches with corresponding descriptors for the file system metadata occupying the unified cache.

10. A data storage system according to claim 9, wherein the file metadata caches include an mode cache for caching mode structures of files of the file system, and a block metadata cache for caching metadata of the file data blocks occupying the file data cache.

11. A method of operating a data storage system having a back-end interface to physical storage including flash memory, a front-end interface to a communications network coupling the data storage system to one or more host computers, and a processing subsystem having memory including battery-backed DRAM, comprising:

instantiating, in the processing subsystem, software defining a layered operating stack including a file system layer, a file cache layer, and a unified cache layer, the unified cache layer providing a unified cache of data blocks including page descriptors each capable of referencing a data block stored in either or both the DRAM or/and the flash memory, the unified cache layer including a reference structure associating file references at the file cache layer with corresponding page descriptors for file data blocks occupying the unified cache; and by the unified cache layer, managing use of the memory for caching data blocks of files being written at the file system layer and cached by the file cache layer, the managing including operations of allocation, access, and eviction/destaging, the allocation operation establishing associative references in the reference structure for data blocks upon initial caching, the access operation using the reference structure to locate cached data blocks based on file references, and the eviction/destaging operation relocating cached data blocks to create room for caching other data blocks, the relocating including a first-level destaging of data blocks from the DRAM to the flash memory at a first time and a second-level destaging of data blocks from the flash memory to the physical storage at a later second time, the first-level destaging maintaining existing associative references and modifying existing page descriptors to add respective references to the flash memory.

12. A method according to claim 11, wherein the file system is an upper-deck file system whose files are stored in a file of a lower-deck file system located in the layered operating stack between the upper-deck file system and the physical storage.

13. A method according to claim 12, wherein the layered operating stack further includes a pool layer for managing the physical storage, the pool layer located between the lower-deck file system and the physical storage.

14. A method according to claim 11, wherein the file system is a lower-deck file system presenting one or more files to an upper storage object layer, each file storing a block storage object.

15. A method according to claim 11, wherein the reference structure is a three-layer structure including page descriptors for cached data blocks, buffer cached (BC) descriptors having references to the page descriptors, and buffer hint (BH) descriptors having references to the BC descriptors, the BH descriptors being associated with hashes of file identification information identifying areas of files of the file system.

16. A method according to claim 15, wherein the descriptors of the three-layer structure are recycled dynamically during operation in response to activity of the file system, recycling being induced in both a top-down manner and a bottom-up manner, the top-down manner being responsive to removal of a file from the file cache, the bottom-up manner being responsive to a need to evict a data block to make room for a new data block.

17. A method according to claim 15, wherein, upon a data block being destaged from the DRAM to the flash memory, a set of associated descriptors is maintained rather than deleted and it is left to subsequent events to determine a new state that pointers of an associated page descriptor transition to as follows:

(1) when a buffer is referenced for write access, then a flash memory pointer is deleted or invalidated;

(2) when a buffer is referenced for read access, then respective values of both a DRAM pointer and a flash memory pointer are maintained;

(3) when a DRAM data block is recycled, then a DRAM pointer is deleted or invalidated; and (4) when a flash memory data block is recycled, then a flash memory pointer is deleted or invalidated.

18. A method according to claim 15, wherein the descriptors employ a set of generation counts by which the use and recycling of the descriptors is managed, including:

(1) when a BH is associated to a BC, a generation count of the BC is saved in the BH, and when the BC is recycled its generation count is incremented, and wherein an attempt to morph a BC-hint from a BH into a reference on a BC will succeed only if the generation count in the BH matches the generation count of the BC; and (2) when a page descriptor is recycled, a generation count of the page descriptor is incremented, and an attempt to morph a page-hint from a BC into a reference on a page descriptor will succeed only if the generation count in the page-hint matches the generation count of the page descriptor.

19. A method according to claim 11, wherein the file cache layer includes a file data cache and one or more file metadata caches, the file data cache providing the file references and the file data blocks stored in the unified cache, the file metadata caches maintaining cached copies of file system metadata also stored in the unified cache, the reference structure associating metadata references of the file metadata caches with corresponding descriptors for the file system metadata occupying the unified cache.

20. A method according to claim 19, wherein the file metadata caches include an Inode cache for caching Inode structures of files of the file system, and a block metadata cache for caching metadata of the file data blocks occupying the file data cache.

* * * * *